US011997288B2

(12) United States Patent
Kwon et al.

(10) Patent No.: US 11,997,288 B2
(45) Date of Patent: May 28, 2024

(54) PERCEPTUAL THREE-DIMENSIONAL (3D) VIDEO CODING BASED ON DEPTH INFORMATION (71) Applicant: Texas Instruments Incorporated, Dallas, TX (US)

(72) Inventors: Do-Kyoung Kwon, Allen, TX (US); Madhukar Budagavi, Plano, TX (US); Ming-Jun Chen, Austin, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 18/216,702

(22) Filed: Jun. 30, 2023

(65) Prior Publication Data
US 2023/0345010 A1 Oct. 26, 2023

Related U.S. Application Data (63) Continuation of application No. 17/243,623, filed on Apr. 29, 2021, now Pat. No. 11,695,936, which is a continuation of application No. 16/911,638, filed on Jun. 25, 2020, now Pat. No. 11,025,916, which is a continuation of application No. 16/562,880, filed on Sep. 6, 2019, now Pat. No. 10,735,743, which is a
(Continued)

(51) Int. Cl.
*H04N 19/00* (2014.01)
*H04N 19/124* (2014.01)
*H04N 19/142* (2014.01)
*H04N 19/154* (2014.01)
*H04N 19/176* (2014.01)
*H04N 19/597* (2014.01)
*H04N 13/00* (2018.01)

(52) U.S. Cl.
CPC ......... *H04N 19/154* (2014.11); *H04N 19/124* (2014.11); *H04N 19/142* (2014.11); *H04N 19/176* (2014.11); *H04N 19/597* (2014.11); *H04N 2013/0081* (2013.01)

(58) Field of Classification Search
CPC .......................... H04N 19/124; H04N 19/154
USPC ...................................... 375/240.03
See application file for complete search history.

(56) References Cited

U.S. PATENT DOCUMENTS 10,735,743 B2  8/2020  Kwon
11,025,916 B2  6/2021  Kwon et al.
(Continued)

OTHER PUBLICATIONS

Krishnamurthy,Ravi,etal."Compressionandtransmissionofdepthmapsforimage-basedrendering." ImageProcessing,2001. Proceedings.2001InternationalConferenceon. vol. 3.IEEE,2001. (Year: 2001).*
(Continued)

*Primary Examiner* — Jeffery A Williams
(74) *Attorney, Agent, or Firm* — Carl G. Peterson; Frank D. Cimino (57) ABSTRACT A method for encoding a multi-view frame in a video encoder is provided that includes computing a depth quality sensitivity measure for a multi-view coding block in the multi-view frame, computing a depth-based perceptual quantization scale for a 2D coding block of the multi-view coding block, wherein the depth-based perceptual quantization scale is based on the depth quality sensitive measure and a base quantization scale for the 2D frame including the 2D coding block, and encoding the 2D coding block using the depth-based perceptual quantization scale.

20 Claims, 3 Drawing Sheets

Related U.S. Application Data continuation of application No. 16/148,764, filed on Oct. 1, 2018, now Pat. No. 10,455,235, which is a continuation of application No. 13/631,841, filed on Sep. 28, 2012, now Pat. No. 10,091,513.

(60) Provisional application No. 61/540,578, filed on Sep. 29, 2011.

(56) References Cited

U.S. PATENT DOCUMENTS

| | | |
|---|---|---|
| 2003/0202707 A1 | 10/2003 | Thyagarajan et al. |
| 2013/0108183 A1 | 5/2013 | Bruls et al. |

OTHER PUBLICATIONS

Philipp Merkle et al, "Efficient Prediction Structures for Multiview Video Coding", IEEE Transactions on Circuits and Systems for Video Technology, vol. 17, No. 11, Nov. 2007, pp. 1461-1473.

Yo-Sung Ho and Kwan-Jung Oh, "Overview of Multi-view Video Coding", 14th International Workshop on Systems, Signals and Image Processing, 2007 and 6th EURASIP Conference focused on Speech and Image Processing, Multimedia Communications and Services, Jun. 27-30, 2007, pp. 5-12.

Ying Chen et al, "The Emerging MVC Standard for 3D Video Services", EURASIP Journal on Advances in Signal Processing, Hindawl Publishing Corporation, vol. 2009, Article ID 786015, Mar. 25, 2008 (14 pages).

Jens-Rainer Ohm, "MPEG Developments in Multi-view Video Coding and 3D Video", European Broadcasting Union (EBU) 3D TV Workshop, Apr. 30, 2009 (21 pages).

K.W. Chun et al, "An Adaptive Perceptual Quantization Algorithm for Video Coding", IEEE Transactions on Consumer Electronics, vol. 39, Issue 3, Aug. 1993, pp. 555-558.

\* cited by examiner

PERCEPTUAL THREE-DIMENSIONAL (3D) VIDEO CODING BASED ON DEPTH INFORMATION

CROSS-REFERENCE TO RELATED APPLICATIONS

This application is a continuation of U.S. patent application Ser. No. 17/243,623, field Apr. 29, 2021, and scheduled to grant as U.S. Pat. No. 11,695,936 on Jul. 4, 2023, which is a continuation of U.S. patent application Ser. No. 16/911,368, filed Jun. 25, 2020 (now U.S. Pat. No. 11,025,916), which is a continuation of U.S. patent application Ser. No. 16/562,880, filed Sep. 6, 2019 (now U.S. Pat. No. 10,735,743), which is a continuation of U.S. patent application Ser. No. 16/148,764, filed Oct. 1, 2018 (now U.S. Pat. No. 10,455,235), which is a continuation of U.S. patent application Ser. No. 13/631,841, filed Sep. 28, 2012 (now U.S. Pat. No. 10,091,513), which claims the benefit of U.S. Provisional Patent Application No. 61/540,578, filed Sep. 29, 2011, all of which are incorporated herein by reference in their entirety.

BACKGROUND OF THE INVENTION

Field of the Invention

Embodiments of the present invention generally relate to perceptual three-dimensional (3D) video coding based on depth information.

Description of the Related Art

The demand for digital video products continues to increase. Some examples of applications for digital video include video communication, security and surveillance, industrial automation, and entertainment (e.g., DV, HDTV, satellite TV, set-top boxes, Internet video streaming, digital cameras, cellular telephones, video jukeboxes, high-end displays and personal video recorders). Further, video applications are becoming increasingly mobile as a result of higher computation power in handsets, advances in battery technology, and high-speed wireless connectivity.

Video compression is an essential enabler for digital video products. Compression-decompression (CODEC) algorithms enable storage and transmission of digital video. In general, the encoding process of video compression generates coded representations of frames or subsets of frames. The encoded video bit stream, i.e., encoded video sequence, may include three types of frames: intra-coded frames (I-frames), predictive coded frames (P-frames), and bi-directionally coded frames (B-frames). I-frames are coded without reference to other frames. P-frames are coded using motion compensated prediction from I-frames or P-frames. B-frames are coded using motion compensated prediction from both past and future reference frames. For encoding, frames maybe divided into smaller blocks, e.g., macroblocks of 16×16 pixels in the luminance space and 8×8 pixels in the chrominance space for the simplest sub-sampling format of H.264/AVC or the quadtree derived coding units of the emerging High Efficiency Video Coding (HEVC) standard.

Video coding standards (e.g., MPEG, H.264, HEVC, etc.) are based on the hybrid video coding technique of block motion compensation and transform coding. Block motion compensation is used to remove temporal redundancy between blocks of a frame and transform coding is used to remove spatial redundancy in the video sequence. Traditional block motion compensation schemes basically assume that objects in a scene undergo a displacement in the x- and y-directions from one frame to the next. Motion vectors are signaled from the encoder to a decoder to describe this motion. As part of forming the coded signal, a block transform is performed and the resulting transform coefficients are quantized to reduce the size of the signal to be transmitted and/or stored.

In some video coding standards, a quantization parameter (QP) is used to modulate the step size of the quantization for each block. For example, in H.264/AVC and HEVC, quantization of a transform coefficient involves dividing the coefficient by a quantization step size. The quantization step size, which may also be referred to as the quantization scale, is define by the standard based on the QP value, which may be an integer from 0 to 51. A step size for a QP value may be determined, for example, using a table lookup and/or by computational derivation. The quality and bit rate of the coded bit stream is determined by the QP value selected by the encoder for quantizing each block. The use of coarser quantization encodes a frame using fewer bits but reduces image quality while the use of finer quantization encodes a frame using more bits but increases image quality. Further, in some standards, the QP values may be modified within a frame. For example, in various versions of the MPEG standard and in H.263 and H.264/AVC, a different QP can be selected for each 16×16 block in a frame. In HEVC, a different QP can be selected for each coding unit.

The block-based coding and use of quantization may cause coding artifacts in the decoded video. For two-dimensional (2D) video, perceptually-based quantization techniques have been used to make these coding artifacts less visible to the human eye. Such techniques vary the QP value for blocks in a frame to distribute the noise and artifacts according to masking properties of the human visual system (HVS). The goal is to maximize the visual quality of an encoded video sequence while keeping the bit rate low. For example, according to HVS theory, the human visual system performs texture masking (also called detail dependence, spatial masking or activity masking). That is, the discrimination threshold of the human eye increases with increasing picture detail, making the human eye less sensitive to quantization noise and coding artifacts in busy or highly textured portions of frames and more sensitive in flat or low-textured portions. During video encoding, this texture masking property of the HVS can be exploited by shaping the quantization noise in the video frame based on the texture content in the different parts of the video frame. More specifically, the quantization step size can be increased in highly textured portions, resulting in coarser quantization and a lower bit rate requirement, and can be decreased in low-textured or flat portions to maintain or improve video quality, resulting in finer quantization but a higher bit rate requirement. The human eye will perceive a "noise-shaped" video frame as having better subjective quality than a video frame which has the same amount of noise evenly distributed throughout the video frame.

SUMMARY

Embodiments of the present invention relate to methods, apparatus, and computer readable media for perceptual three-dimensional (3D) video coding based on depth information. In one aspect, a method for encoding a multi-view frame in a video encoder is provided, wherein the multi-view frame comprises a plurality of two-dimensional (2D) frames. The method includes computing a depth quality sensitivity measure for a multi-view coding block in the multi-view frame, computing a depth-based perceptual quantization scale for a 2D coding block of the multi-view coding block, wherein the depth-based perceptual quantization scale is based on the depth quality sensitive measure and a base quantization scale for the 2D frame including the 2D coding block, and encoding the 2D coding block using the depth-based perceptual quantization scale.

In one aspect, an apparatus configured to perform video encoding of a multi-view frame is provided, wherein the multi-view frame comprises a plurality of two-dimensional (2D) frames. The apparatus includes means for computing a depth quality sensitivity measure for a multi-view coding block in the multi-view frame, means for computing a depth-based perceptual quantization scale for a 2D coding block of the multi-view coding block, wherein the depth-based perceptual quantization scale is based on the depth quality sensitive measure and a base quantization scale for the 2D frame including the 2D coding block, and means for encoding the 2D coding block using the depth-based perceptual quantization scale.

In one aspect, a non-transitory computer-readable medium is provided that stores software instructions that, when executed by a processor, perform a method for encoding a multi-view frame, wherein the multi-view frame comprises a plurality of two-dimensional (2D) frames. The method includes computing a depth quality sensitivity measure for a multi-view coding block in the multi-view frame, computing a depth-based perceptual quantization scale for a 2D coding block of the multi-view coding block, wherein the depth-based perceptual quantization scale is based on the depth quality sensitive measure and a base quantization scale for the 2D frame including the 2D coding block, and encoding the 2D coding block using the depth-based perceptual quantization scale.

BRIEF DESCRIPTION OF THE DRAWINGS

Particular embodiments will now be described, by way of example only, and with reference to the accompanying drawings.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency.

As used herein, a frame is a complete image captured during a known time interval. For convenience of description, embodiments of the invention are described herein using the terminology of the H.264/AVC video coding standard. One of ordinary skill in the art will understand that embodiments of the invention are not limited to H.264/AVC.

As previously mentioned, perceptual quantization may be used in 2D video to increase the perceptual quality of the video. However, three-dimensional (3D) video is becoming increasingly popular and is expected to replace 2D video in many markets. There are number of 3D video technologies, such as holography, time-of-flight, structured light, and multi-view video. The multi-view video technology is a key technology for various applications, including freeviewpoint video (FVV), free-viewpoint television (FVT), immersive teleconference, and 3DTV. In general, multi-view video includes multiple video sequences of a scene captured by several cameras concurrently but in differing locations. One form of multi-view video is stereoscopic video in which two video sequences (views) of a scene are captured by imaging sensors positioned at slightly different viewpoints such that the same objects appear in each corresponding frames of the resulting video sequences but are shifted horizontally in one frame relative to the other.

While the techniques used for perceptual quantization of 2D video may be applied to the 2D frames of multi-view video to enhance the perceptual quality of each individual frame of each captured view, these techniques do not consider the 3D perceptual characteristics of multi-view video. In 3D video, the depth of pixels in a frame of 3D video may be closely related to the perceptual quality of that frame. That is, the human eye is likely more sensitive to distortion in areas of a 3D scene closer to the viewer than in more distant areas. Accordingly, a depth-based approach to perceptual quantization of 3D video may help improve the perceptual quality of the video. Embodiments of the invention provide for perceptual quantization for 3D video sequences that is based on the depth of pixels in 3D video.

More specifically, in embodiments of the invention, the base quantization scale Q for each video frame in a multi-view video sequence as determined, for example, by rate control in a video encoder, is adaptively scaled for each coding block, e.g., macroblock or coding unit, in the frame based on a measure of the sensitivity of the perceptual quality of the coding block to the depth of that coding block in the scene captured by the frame. A measure of the depth quality sensitivity of a coding block in corresponding frames of multi-view video sequences may be determined by a depth quality sensitivity function.

In general, in embodiments of the invention, based on a computed depth quality sensitivity measure, the base quantization step size is increased in coding blocks having a lower depth quality sensitivity measure, resulting in coarser quantization and a lower bit rate requirement, and is decreased in macroblocks having a higher depth quality sensitivity measure to maintain or improve video quality, resulting in finer quantization but a higher bit rate requirement. The human eye may perceive the resulting video frame as having better subjective quality than a video frame which has the same amount of noise evenly distributed throughout the video frame.

For simplicity of explanation, some embodiments of the invention are described herein assuming a 3D multi-view video sequence that is a stereoscopic video sequence. As previously mentioned, a stereoscopic video sequence includes left and right 2D video sequences of a scene. One of ordinary skill in the art, having benefit of these descriptions, will understand embodiments in which a multi-view video sequence includes more than two corresponding 2D video sequences.

Figure 1:
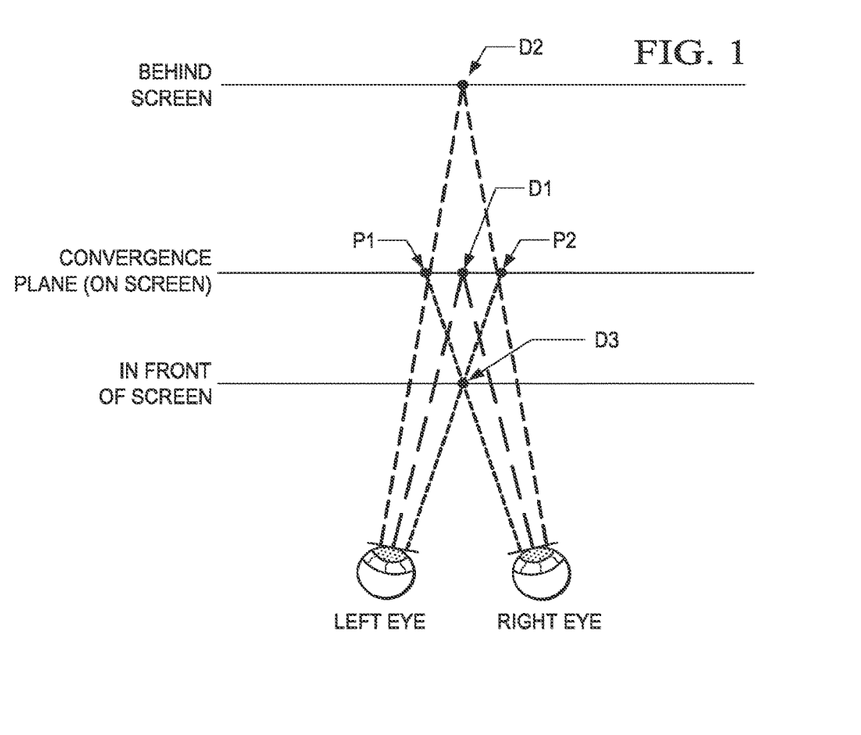
FIG. 1 is a diagram illustrating viewing of a three-dimensional (3D) image.

Objects at different depths in the scene of a stereoscopic video sequence will have different displacements, i.e., disparities, in left and right frames of the stereoscopic video sequence, thus creating a sense of depth when the stereoscopic image is viewed on a stereoscopic display. The term disparity refers to the shift that occurs at each point in a scene between the left and right images. This shift may be mostly horizontal when the imaging sensors used to capture the left and right images are offset horizontally. As illustrated in FIG. 1, at the point of convergence D1, corresponding objects in the left and right images are said to have zero horizontal disparity and, when viewed on a stereoscopic display, will appear to be on the display plane. Objects in front of the convergence point, e.g., at point D3, will have negative disparity, i.e., an object in the left image is horizontally shifted to the right of the corresponding object in the right image and will appear in front of the display plane (closer to the viewer). Objects behind the convergence point, e.g., at point D2, will have positive disparity, i.e., an object in the left image is horizontally shifted to the left of the corresponding object in the right image and will appear to be behind the display plane (further from the viewer).

The amount of shift or disparity may vary from pixel to pixel depending on the depth of the corresponding 3D point in the scene. Further, the depth of a pixel in the 3D scene of each frame of a stereoscopic video is inversely proportional to the disparity of that pixel of the pixel between the corresponding left and right frames and thus may be computed from the disparity. More specifically, a depth map or depth image for each frame of a stereoscopic video that represents the depth of each pixel in the frame may be computed based on the disparity of the pixels between the corresponding left and right frames in the two 2D video sequences.

The derivation of the depth-based perceptual quantization scaling factor for macroblocks in a frame of stereocopic video is now described. For simplicity without loss of generality, assume that all macroblocks in a frame have the same rate distortion characteristics, i.e., for a give quantization scale value Q, all MBs have same rate and distortion. Also assume that there are N macroblocks in a frame. Given this assumption, for each macroblock, the distortion D may be modeled by $$D = \frac{Q^2}{12}. \quad (1)$$

Further, assume a depth quality sensitivity function $f(d, d_0)$, where d is the depth of a macroblock in a frame of a stereoscopic video and do is a depth with the least quality sensitivity. For example, the depth quality sensitivity function may be $$f(d,d_0)=c_0 \cdot |d-d_0|+c_1, \quad (2)$$

where $c_0$ and $c_1$ are tuning parameters. The tuning parameter $c_0$ is a scaling factor that controls the relationship of perceptual quality sensitivity to depth. For example, if $c_0=1$, quality sensitivity is exactly proportional to depth. The tuning parameter $c_1$ may be used to ensure that some amount of perceptual quality improvement is performed macroblocks in which $d_{far}$ (or $d_0$)=d.

In some applications, $d_0=d_{far}$ where $d_{far}$ is the farthest depth of a macroblock in the frame. If $d_0=d_{far}$ is used, the implication is that the farthest object in a scene has the least quality sensitivity. The value of $d_{far}$ may be, for example, computed as the maximum of the depths of the macroblocks in a frame. In some applications, rather than using $d_{far}$, the value of do may be set by a user based on known characteristics of the video sequences for a particular application. In another example, video analytics may be performed as the video is captured to determine the depth range of the most visually important area in a scene and the value of do adapted accordingly. The values of $c_0$ and $c_1$ may also be adapted based on scene analysis performed by the video analytics.

Other suitable depth quality sensitivity functions may also be used that represent the sensitivity of the perceptual quality of the depth of pixels in a macroblock to the relative depth of those pixels in the frame. For example, the depth-quality sensitivity function may be a multi-order polynomial function of d and do.

Given a depth-quality sensitivity function for an MB, depth-based perceptual distortion can be modeled by $$D = f(d, d_0) \cdot \frac{Q^2}{12}. \quad (3)$$

The average depth-quality sensitivity of all macroblocks in a frame may be denoted as $DQS_{avg}$. Give the base quantization scale for a frame, $Q_{base}$, before perceptual scaling, the total frame depth-based distortion may be expressed as $$D = \sum_{i=1}^{N} DQS_{avg} \cdot \frac{Q_{base}^2}{12} = \frac{N}{12} \cdot DQS_{avg} \cdot Q_{base}^2. \quad (4)$$

The goal is to determine a quantization scale $Q_i$ for each macroblock i of the N macroblocks in a frame such that that total frame depth-based perceptual distortion is minimized. More specifically, the goal is to maximize $$J = \frac{N}{12} \cdot DQS_{avg} \cdot Q_{base}^2 - \sum_{i=1}^{N} f(d_i, d_0) \cdot \frac{Q_i^2}{12} \quad (5)$$

subject to $$\frac{1}{N}\sum_{i=1}^{N} Q_i = Q_{base}.$$

The constraint in this equation is based on the starting assumption that all macroblocks in a frame generate the same number of bits for the same quantization scale value Q. Given this assumption, the total number of bits output for frame should be unchanged after the quantization values $Q_i$ for the macroblocks are scaled for perceptual quality. Thus, the average of the scaled Q values for the macroblocks in a frame should be equal to the base quantization scale for the frame, $Q_{base}$.

To solve Eq. 5, $Q_{base}$ may be expressed in terms of $Q_j$ for j-th macroblock, based on the constraint in Eq. (5):

$$Q_{base}^2 = Q_j^2 + 2 \cdot Q_j \cdot (N \cdot Q_{base} - Q_j) + \text{rest of } non-j \text{ terms.} \quad (6)$$

Substituting Eq. 6 into Eq. 5 and setting the derivative of Eq. 5 with respect to. $Q_j$ to 0, for all j=1, 2, . . . , N, $$Q_j = \frac{N \cdot DQS_{avg}}{N \cdot f(d_j, d_0) + DQS_{avg}} \cdot Q_{base}. \quad (7)$$

Thus, the base quantization scale $Q_{base}$ of a frame in each 2D video sequence in a 3D video sequence may be scaled for each 2D macroblock in the 2D frame as per Eq. 7 to improve the perceptual quality of the 3D video frame.

As was previously stated, this derivation assumes that all macroblocks in a frame have the same rate distortion characteristics, i.e., for a given quantization scale value Q, all MBs have the same rate and distortion. In practice, this assumption is not accurate. Thus, when Eq. 7 is used to generate the depth-based perceptual quantization scales for macroblocks, the bit count for a frame encoded using these quantization scales may be larger (or smaller) than that set by rate control. Thus, the depth quality sensitivity function $f(d, d_0)$ used may need to be parameterized to so that the function can be fine tuned to meet the bit count set by rate control. For example, in the depth quality sensitivity function of Eq. 2, the tuning parameters $c_0$ and $c_1$ may be used to fine tune the function.

Figure 2:
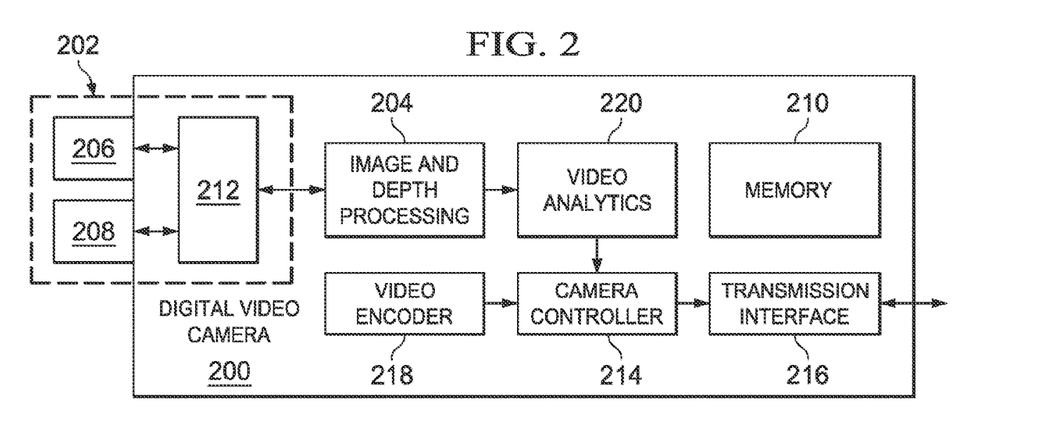
FIG. 2 is a block diagram of a 3D digital video camera.

FIG. 2 is a block diagram of an example digital video camera 200 that may be configured to perform depth based perceptual quantization scaling as part of encoding a 3D video sequence. The camera 200 includes a 3D imaging system 202, an image and depth processing component 204, a video encoder component 218, a memory component 210, a video analytics component 220, a camera controller component 214, and a transmission interface component 216. The components of the camera 200 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc. Further, software instructions may be stored in memory in the memory component 210 and executed by one or more processors.

The 3D imaging system 202 includes two imaging components 206, 208 and a controller component 212 for capturing the data needed to generate a 3D video sequence. Assuming the camera is a stereoscopic camera, the imaging components 206, 208 are imaging sensor systems arranged to capture image signals of a scene from a left viewpoint and a right viewpoint. That is, one imaging sensor system 206 is arranged to capture an image signal from the left viewpoint, i.e., a left analog image signal, and the other imaging sensor system 208 is arranged to capture an image signal from the right view point, i.e., a right analog image signal. Each of the imaging sensor systems 206, 208 includes a lens assembly, a lens actuator, an aperture, and an imaging sensor. The 3D imaging system 202 also includes circuitry for controlling various aspects of the operation of the system, such as, for example, aperture opening amount, exposure time, etc. The controller module 212 includes functionality to convey control information from the camera controller 214 to the imaging sensor systems 206, 208, to convert the left and right analog image signals to left and right digital image signals, and to provide the left and right digital image signals to the image and depth processing component 204.

The image and depth processing component 204 divides the incoming digital signals from the imaging sensor systems 206, 208 into corresponding left and right 2D frames of pixels and processes each 2D frame to enhance the image data in the frame. The processing performed may include one or more image enhancement techniques such as, for example, black clamping, fault pixel correction, color filter array (CFA) interpolation, gamma correction, white balancing, color space conversion, edge enhancement, denoising, contrast enhancement, detection of the quality of the lens focus for auto focusing, and detection of average scene brightness for auto exposure adjustment on each of the left and right frames.

The image and depth processing component 204 then uses the enhanced image data in each frame pair to generate a depth image (also referred to as a depth map) for each 3D frame that represents the relative depths of each pixel in the 3D frame. Any suitable technique may be used to generate the depth image from the enhanced image data. The depth images are provided to the video encoder component 218 and the video analytics component 220. The left and right 2D frames are also provided to the video analytics component 220 and the video encoder component 218.

The video encoder component 218 encodes the 3D video sequence captured by imaging sensor systems 206, 208 in accordance with a video compression standard such as, for example, the Moving Picture Experts Group (MPEG) video compression standards, e.g., MPEG-1, MPEG-2, and MPEG-4, the ITU-T video compressions standards, e.g., H.263 and H.264/AVC, the Society of Motion Picture and Television Engineers (SMPTE) 421 M video CODEC standard (commonly referred to as "VC-1"), the video compression standard defined by the Audio Video Coding Standard Workgroup of China (commonly referred to as "AVS"), the ITU-T/ISO High Efficiency Video Coding (HEVC) standard, etc. The video encoder 218 may be configured to perform depth-based perceptual coding of the 3D video sequence as described herein in reference to FIGS. 3 and 4.

The memory component 210 may be on-chip memory, external memory, or a combination thereof. Any suitable memory design may be used. For example, the memory component 210 may include static random access memory (SRAM), dynamic random access memory (DRAM), synchronous DRAM (SDRAM), read-only memory (ROM), flash memory, a combination thereof, or the like. Various components in the digital video camera 200 may store information in memory in the memory component 210 as a video stream is processed. For example, the video encoder component 218 may store reference data in a memory of the memory component 210 for use in encoding frames in the video stream. Further, the memory component 210 may store any software instructions that are executed by one or more processors (not shown) to perform some or all of the described functionality of the various components.

Some or all of the software instructions may be initially stored in a computer-readable medium such as a compact disc (CD), a diskette, a tape, a file, memory, or any other computer readable storage device and loaded and stored on the digital video camera 200. In some cases, the software instructions may also be sold in a computer program product, which includes the computer-readable medium and packaging materials for the computer-readable medium. In some cases, the software instructions may be distributed to the digital video camera 200 via removable computer readable media (e.g., floppy disk, optical disk, flash memory, USB key), via a transmission path from computer readable media on another computer system (e.g., a server), etc.

The camera controller component 214 controls the overall functioning of the digital video camera 200. For example, the camera controller component 214 may adjust the focus and/or exposure of the 3D imaging system 202 based on the focus quality and scene brightness, respectively, determined by the image and depth processing component 204. The camera controller component 214 also controls the transmission of the encoded video stream via the transmission interface component 216 and may control reception and response to camera control information received via the transmission interface component 216. Further, the camera controller component 214 controls the transfer of information from the video analytics component 220 via the transmission interface component 216.

The transmission interface component 216 allows the digital video camera 200 to communicate with a digital system arranged to receive the encoded video, e.g., a monitoring system in a surveillance system or a personal computer system. The transmission interface component 216 may provide an interface for a wired connection, e.g., an Ethernet cable or the like, and/or for a wireless connection. The transmission interface component 216 may use any suitable network protocol(s).

The video analytics component 220 analyzes the content of depth images in the captured video stream to detect and determine temporal information not based on a single image. The analysis capabilities of the video analytics component 220 may vary in embodiments depending on such factors as the processing capability of the digital video camera 200, the particular application for which the digital video camera is being used, etc. For example, the analysis capabilities may range from video motion detection in which motion is detected with respect to a fixed background model to people counting, detection of objects crossing lines or areas of interest, object tracking, automatically analyzing and tagging suspicious objects in a scene, activating alarms or taking other actions to alert security personnel, etc. As is described in more detail herein, in some embodiments, the results of scene analysis performed by the video analytics component 220 may be used to adapt the performance of the depth based perceptual coding performed by the video encoder component 218.

Figure 3:
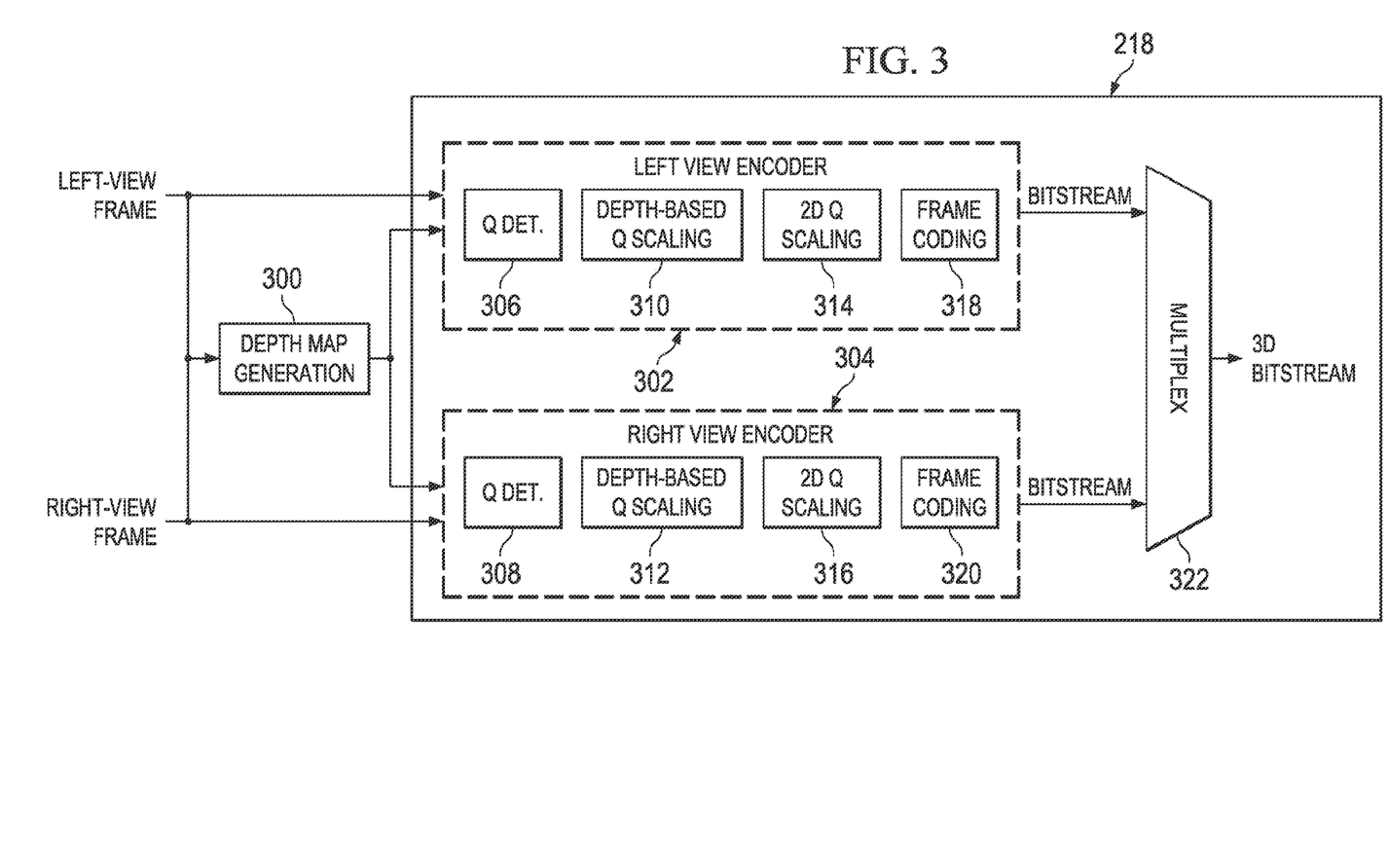
FIG. 3 is a block diagram of a video encoder.

FIG. 3 is a block diagram illustrating the logical encoding flow of the digital video camera 200 of FIG. 2. In general, the video encoder component 218 applies a hybrid coding scheme of block-based prediction and transform coding to each of the 2D video sequences. In such a scheme, each input signal is split into rectangular blocks that are predicted from the previously decoded data by either motion compensated inter prediction or intra prediction. The resulting prediction error is coded by applying block transforms based on, for example, an integer approximation of the discrete cosine transform, which is followed by quantization and entropy coding of the transform coefficients.

As shown in FIG. 3, the left view frames from the left imaging component 208 are coded by a left view encoder 302 and the right view frames from the right imaging component 206 are coded by a right view encoder 304. Each of these view encoders 302, 304 processes the respective video stream in a similar fashion to generate a compressed bit stream. Prior to encoding of the left view frame and the right view frame, a depth map is generated 300 for the two frames. This depth map represents the depth of each pixel in the 3D frame corresponding to the two 2D frames. The depth map is generated by the image and depth processing component 204.

For each of the left and right frames, an initial quantization scale n $Q_{base}$ is determined 306, 308. These initial base quantization scales may be determined using any suitable rate control technique. Depth-based perceptual quantization scaling 310, 312 is then performed to adapt the respective base quantization scales of the frames for each macroblock in the respective frames to generate a depth-based perceptual quantization scale for each of the macroblocks. The macroblock depth-based perceptual quantization scale is adapted from the frame base quantization scale based on a depth quality sensitivity measure computed for each macroblock. The depth quality sensitivity measure for each macroblock is determined using the depth map generated for the frame pair. Depth-based perceptual quantization scaling is described in more detail herein in reference to the method of FIG. 4.

Two-dimensional (2D) perceptual quantization scaling 314, 316 may also be performed to further adapt the depth-based perceptual quantization scales computed for the macroblocks. Any suitable technique for 2D perceptual quantization scaling may be used. The macroblocks in the frame are then coded 318, 320 to generate respective compressed bit streams that multiplexed 322 to generate the final compressed 3D bit stream. As part of the frame coding 318, 320, the quantization is performed on the transform coefficients generated for each macroblock. For each macroblock, the quantization is performed using the quantization scale determined for the macroblock by the depth-based perceptual quantization scaling and the 2D perceptual quantization scaling.

Figure 4:
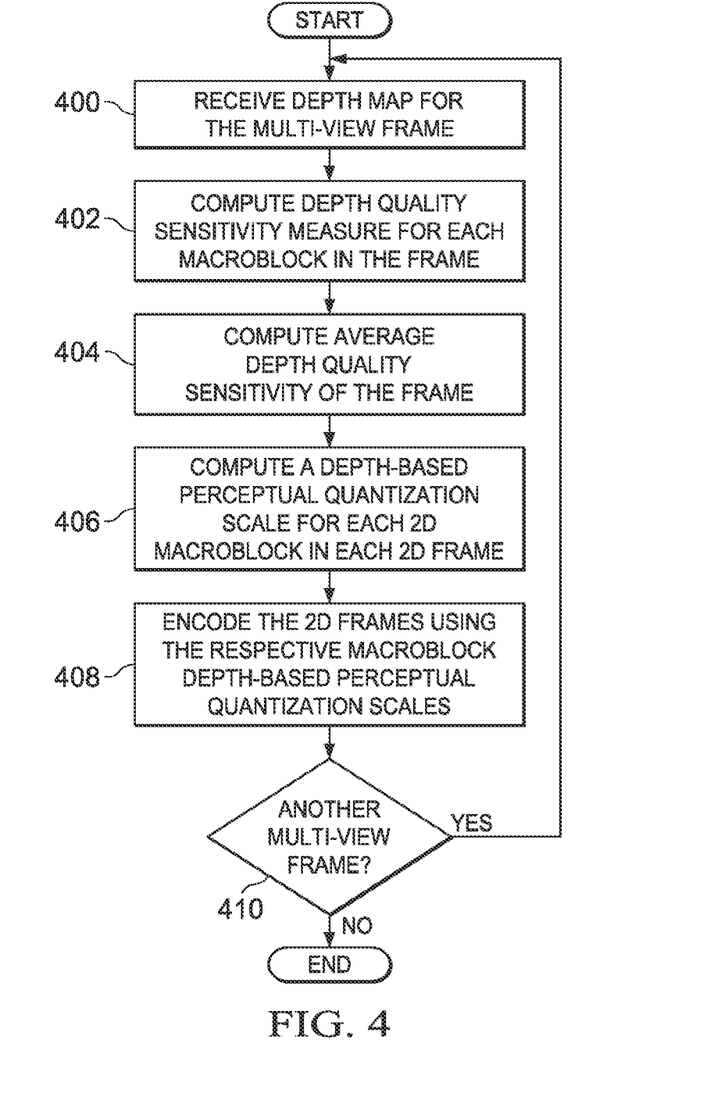
FIG. 4 is a flow diagram of a depth-based perceptual encoding method.

FIG. 4 is a flow diagram of a method for encoding frames of a multi-view 3D video sequence using depth-based perceptual quantization that may be used, for example, by the video encoder component 218 of FIG. 2 for stereoscopic multi-view video sequences. As was previously mentioned, a multi-view 3D video sequence may be a mixture of two or more 2D video sequences captured concurrently by respective two or more imaging sensors arranged to capture the same scene from different relative locations. Each frame of the multi-view video sequence is composed of temporally corresponding frames of the two or more 2D video sequences. The method is described assuming that the depth based quantization scales for the 2D macroblocks are computed as per Eq. 7 above.

Initially, a depth map for the multi-view frame is received 400. The depth map includes suitable values representing the depth of each pixel in the multi-view frame. A depth quality sensitivity measure is then computed 402 for each of the N multi-view macroblocks in the multi-view frame. The depth quality sensitivity measure may be computed as per a depth quality sensitivity function $f(d, d_0)$, where d is the depth of the macroblock in the frame and do is a depth with the least quality sensitivity. The depth of a macroblock may be derived from the corresponding pixel depths in the depth map and may be computed in any suitable way. For example, the depth may be computed as the average of the corresponding pixel depths in the depth map.

Any suitable depth quality sensitivity function may be used. For example, the function of Eq. 2 may be used. The values of do and the tuning parameters $c_0$ and $c_1$ may depend on the particular application in which the video encoder is used, e.g., the values may be constants in some applications, may be user-settable parameters in some applications, may be adapted in some way for scene changes in some applications, etc.. In some embodiments, the value of do may be determined for each multi-view frame as the maximum of the depths of the macroblocks in the multi-view frame. In some embodiments, the value of do may be adapted periodically based on the maximum macroblock depth of a sequence of multi-view frames. In some embodiments in which the background of a scene does not change significantly over time, e.g., for video surveillance, the value of do and the values of the tuning parameters $c_0$ and $c_1$ may be constants determined based on the background of the scene and the expected depths of objects that may move through the scene. In some embodiments, the video analytics component 220 (see FIG. 2) may analyze the scene across multiple frames and provide information regarding scene changes to the video encoder component 218 that may be used to adapt the values of $d_0$, $c_0$ and/or $c_1$ for scene changes. In some embodiments, the depth quality sensitivity function may not be linear. For example, a quadratic depth quality sensitivity function may be used when both closer and more distant objects are more visually important than objects in between.

The average depth quality sensitivity $DQS_{avg}$ of the N macroblocks in the multi-view frame is then computed 404.

This average may be computed by averaging the depth quality sensitivity measures computed for the N multi-view macroblocks.

A depth-based perceptual quantization scale is then computed 406 for each of the N 2D macroblocks in each 2D frame of the multi-view frame. As shown in Eq. 7, the depth-based perceptual quantization scale for a 2D macroblock is determined by applying a depth-based perceptual scaling factor to the base quantization scale $Q_{base}$ of the respective 2D frame. The depth-based perceptual scaling factor for a 2D macroblock is based on the depth quality sensitivity measure computed for the multi-view macroblock, the average depth quality sensitivity $DQS_{avg}$ of the multi-view frame, and the number of macroblocks N in the frame. As is well known, the base quantization scale for a frame may be determined by rate control in the video encoder.

The 2D frames are then encoded 408 using the respective macroblock depth-based perceptual quantization scales. More specifically, as part of the encoding process, for each 2D frame, the transform coefficients of each 2D macroblock in the frame are quantized using the depth-based perceptual quantization scale computed for the macroblock. The method is then repeated for the next multi-view frame, if any 410.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, the block diagram of FIG. 3 depicts two separate encoders, one for the left 2D video stream and one for the right 2D video stream. In some embodiments, the two encoders may be separately implemented. In some embodiments, encoding of the two input streams may be performed by interleaving the processing of the left and right frames on a single video encoder implementation.

In another example, in some embodiments, the video encoder may compute the depth map rather than receiving a pre-computed depth map.

In another example, embodiments have been described herein in which a different base quantization scale $Q_{base}$ is assumed for each 2D frame of a multi-view frame. In some embodiments, the same $Q_{base}$ may be used for the 2D frames of a multi-view frame.

In another example, in some embodiments, depth based Q scaling and 2D based scaling may be combined. In such embodiments, $Q_{base}$ may be scaled using both a depth quality sensitivity function and texture masking.

Embodiments of the method described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

It is therefore contemplated that the appended claims will cover any such modifications of the embodiments as fall within the true scope of the invention.

What is claimed is:

1. A method comprising:
computing a depth quality sensitivity measure for each coding block in a multi-view frame based on a depth map for the multi-view frame;
computing a depth-based perceptual quantization scale for each coding block by at least:
selecting a first quantization scale for a first coding block having a first depth quality sensitivity measure, wherein the first quantization scale is coarser than a base quantization step size; and
selecting a second quantization scale for a second coding block having a second depth quality sensitivity measure, wherein the second depth quality sensitivity measure is higher than the first depth quality sensitivity measure, and wherein the second quantization scale is finer than the base quantization step size;
encoding the first coding block using the first quantization scale; and
encoding the second coding block using the second quantization scale.

2. The method of claim 1,
wherein the first quantization scale is higher than the base quantization step size, and
wherein the second quantization scale is lower than the base quantization step size.

3. The method of claim 1,
wherein encoding the first coding block comprises encoding a first two-dimensional coding block in a two-dimensional frame of the multi-view frame, and
wherein encoding the second coding block comprises encoding a second two-dimensional coding block in the two-dimensional frame.

4. The method of claim 1, wherein the multi-view frame comprises a stereoscopic frame including a left 2D frame and a right 2D frame.

5. The method of claim 1, wherein computing the depth quality sensitivity measure for each coding block is based on a received depth map for the multi-view frame.

6. The method of claim 5, wherein computing the depth quality sensitivity measure comprises computing the depth quality sensitivity measure as a function of a depth of the coding block and a depth with a least quality sensitivity.

7. The method of claim 6, wherein the depth with the least quality sensitivity is a farthest depth of a coding block in the multi-view frame.

8. The method of claim 6, wherein the depth with the least quality sensitivity is user-specified.

9. The method of claim 1, further comprising determining a depth-based perceptual scaling factor based on the depth quality sensitivity measure, an average of depth quality sensitivity measures of all coding blocks in the multi-view frame, and a number of coding blocks in the multi-view frame,
    wherein computing the depth-based perceptual quantization scale comprises applying the depth-based perceptual scaling factor to the base quantization step size.

10. A non-transitory computer-readable medium storing software instructions that, when executed by a processor, cause the processor to:
    compute a depth quality sensitivity measure for each coding block in a multi-view frame based on a depth map for the multi-view frame;
    compute a depth-based perceptual quantization scale for each coding block by at least:
        selecting a first quantization scale for a first coding block having a first depth quality sensitivity measure, wherein the first quantization scale is coarser than a base quantization step size; and
        selecting a second quantization scale for a second coding block having a second depth quality sensitivity measure, wherein the second depth quality sensitivity measure is higher than the first depth quality sensitivity measure, and wherein the second quantization scale is finer than the base quantization step size;
    encode the first coding block using the first quantization scale; and
    encode the second coding block using the second quantization scale.

11. The non-transitory computer readable medium of claim 10,
    wherein the first quantization scale is higher than the base quantization step size, and
    wherein the second quantization scale is lower than the base quantization step size.

12. The non-transitory computer readable medium of claim 10,
    wherein the instructions to encode the first coding block comprise instructions to encode a first two-dimensional coding block in a two-dimensional frame of the multi-view frame, and
    wherein the instructions to encode the second coding block comprise instructions to encode a second two-dimensional coding block in the two-dimensional frame.

13. The non-transitory computer readable medium of claim 10, wherein the multi-view frame comprises a stereoscopic frame including a left 2D frame and a right 2D frame.

14. The non-transitory computer readable medium of claim 10, wherein computing the depth quality sensitivity measure for each coding block is based on a received depth map for the multi-view frame.

15. The non-transitory computer readable medium of claim 14,
    wherein the instructions to compute the depth quality sensitivity measure comprise instructions to compute the depth quality sensitivity measure as a function of a depth of the coding block and a depth with a least quality sensitivity.

16. The non-transitory computer readable medium of claim 15, wherein the depth with the least quality sensitivity is a farthest depth of a coding block in the multi-view frame.

17. The non-transitory computer readable medium of claim 15, wherein the depth with the least quality sensitivity is user-specified.

18. The non-transitory computer readable medium of claim 10,
    wherein the instructions are executable by the processor for further causing the processor to determine a depth-based perceptual scaling factor based on the depth quality sensitivity measure, an average of depth quality sensitivity measures of all coding blocks in the multi-view frame, and a number of coding blocks in the multi-view frame, and
    wherein the instructions to compute the depth-based perceptual quantization scale comprise instructions to apply the depth-based perceptual scaling factor to the base quantization step size.

19. An apparatus comprising:
    means for computing a depth quality sensitivity measure for each coding block in a multi-view frame based on a depth map for the multi-view frame;
    means for computing a depth-based perceptual quantization scale for each coding block by at least:
        selecting a first quantization scale for a first coding block having a first depth quality sensitivity measure, wherein the first quantization scale is coarser than a base quantization step size; and
        selecting a second quantization scale for a second coding block having a second depth quality sensitivity measure, wherein the second depth quality sensitivity measure is higher than the first depth quality sensitivity measure, and wherein the second quantization scale is finer than the base quantization step size;
    means for encoding the first coding block using the first quantization scale; and
    means for encoding the second coding block using the second quantization scale.

20. The apparatus of claim 19,
    wherein the first quantization scale is higher than the base quantization step size, and
    wherein the second quantization scale is lower than the base quantization step size.

* * * * *